(12) United States Patent
Petersen

(10) Patent No.: US 11,555,445 B2
(45) Date of Patent: Jan. 17, 2023

(54) AUTOMATIC CLEANED DRAIN PIPING SYSTEM ON CROSSHEAD TYPE TWO-STROKE ENGINES, HAVING A SLOW ROTATING CENTRELESS FLEXIBLE SPIRAL AUGER FIXED MOUNTED IN THE PIPING SYSTEM

(71) Applicant: Thorhansa ApS, Sydals (DK)

(72) Inventor: Hansa Maria Petersen, Sydals (DK)

(73) Assignee: Thorhansa ApS, Sydals (DK)

( * ) Notice: Subject to any disclaimer, the term of this patent is extended or adjusted under 35 U.S.C. 154(b) by 422 days.

(21) Appl. No.: 16/623,880

(22) PCT Filed: Jun. 15, 2018

(86) PCT No.: PCT/DK2018/050146
§ 371 (c)(1),
(2) Date: Dec. 18, 2019

(87) PCT Pub. No.: WO2018/233789
PCT Pub. Date: Dec. 27, 2018

(65) Prior Publication Data
US 2020/0400067 A1   Dec. 24, 2020

(30) Foreign Application Priority Data
Jun. 20, 2017   (DK) .............................. PA201700364

(51) Int. Cl.
*F02B 77/04*   (2006.01)
*B08B 9/045*   (2006.01)
(Continued)

(52) U.S. Cl.
CPC .............. *F02B 77/04* (2013.01); *B08B 9/045* (2013.01); *B65G 33/14* (2013.01); *B65G 33/16* (2013.01);
(Continued)

(58) Field of Classification Search
CPC .... F02B 77/04; F02B 2075/025; B08B 9/045; B65G 33/14; B65G 33/16; B65G 33/34;
(Continued)

(56) References Cited

U.S. PATENT DOCUMENTS 1,568,094 A *  1/1926  Shelburne ............... F02B 77/04
                                                        15/104.16
5,368,153 A    11/1994  Bruke
(Continued)

FOREIGN PATENT DOCUMENTS

CN      101415936 A    4/2009
CN      204412719 U    6/2015
(Continued)

OTHER PUBLICATIONS

Supplementary European Search Report for European Patent Application No. EP 18820273.3 dated Dec. 7, 2020.
(Continued)

*Primary Examiner* — Gene O Crawford
*Assistant Examiner* — Keith R Campbell
(74) *Attorney, Agent, or Firm* — McCormick, Paulding & Huber PLLC

(57) ABSTRACT

Automatic cleaned drain piping system on crosshead type two-stroke engines. The invention is having a slow rotating centreless flexible spiral auger fixed mounted in the piping system.

17 Claims, 4 Drawing Sheets

(51) Int. Cl.
*B65G 33/14* (2006.01)
*B65G 33/16* (2006.01)

(52) U.S. Cl.
CPC ............... *B65G 2812/0505* (2013.01); *B65G 2812/0527* (2013.01)

(58) Field of Classification Search
CPC .... B65G 2812/0505; B65G 2812/0527; B65G 2812/0577
See application file for complete search history.

(56) References Cited

U.S. PATENT DOCUMENTS

| | | | |
|---|---|---|---|
| 6,283,275 | B1 | 9/2001 | Morris et al. |
| 10,696,904 | B2 * | 6/2020 | Stanley ................... C10B 47/44 |
| 2002/0088691 | A1 | 7/2002 | Hesketh et al. |
| 2004/0250370 | A1 * | 12/2004 | Augustus ................ B08B 9/021 |
| | | | 15/304 |

FOREIGN PATENT DOCUMENTS

| | | |
|---|---|---|
| DE | 10 2005 035 509 A1 | 2/2007 |
| GB | 468813 | 7/1937 |
| GB | 797058 | 6/1958 |
| GB | 1014831 | 12/1965 |
| WO | 2007115580 A1 | 10/2007 |

OTHER PUBLICATIONS

International Search Report for PCT Application No. PCT/DK2018/050146 dated Sep. 5, 2018.

* cited by examiner

AUTOMATIC CLEANED DRAIN PIPING SYSTEM ON CROSSHEAD TYPE TWO-STROKE ENGINES, HAVING A SLOW ROTATING CENTRELESS FLEXIBLE SPIRAL AUGER FIXED MOUNTED IN THE PIPING SYSTEM

CROSS-REFERENCE TO RELATED APPLICATIONS

This application is a National Stage application of International Patent Application No. PCT/DK2018/050146, filed on Jun. 15, 2018, which claims priority to Danish Application No. PA201700364 filed Jun. 20, 2017, each of which is hereby incorporated by reference in its entirety.

BACKGROUND

Cleanness of the drain pipes is essential to safe and reliable operation of the engine. The drain piping on these engines are designed for the draining of relative small amount (slow flow in the pipes) of lubricating oil mixed with heavy/solid components by gravity flow. The same drain piping is having another vital safety related purpose. During abnormal operation conditions, large leakages (fast flow inside the pipes) of fuel, cooling water or lubricating oil may occur from these engines. It is of outmost importance, that the drain piping is clean and empty—standby to drain away such abnormal large leak by gravity flow. Safe and efficient draining in such abnormal condition is essential for the safety of personnel and protection of the engine.

The object of the present invention, is to constant avoiding build-up of deposit inside the drain pipes during normal operation. My invention will prevent partly or full blockage of the drain piping. The invention will help to trouble free, reliable and safe continued operation of the engine. The invention will give dramatic savings in man-hours, cleaning chemicals and materials used during manual pipe cleaning.

SUMMARY

The objects is solved with the system according to the claims, this including an automatic cleaning system with rotating flexible centreless spiral auger fixed mounted in piping system draining from piston rod stuffing boxes of an engine, drain piping draining from scavenge air space and piston underside space of the engine, drain piping draining from scavenge air receiver of the engine, characterized by having a centreless flexible spiral auger fixed mounted in the piping system, where the main transport trough the piping is the free flow of liquid which flows in the hollow part of the centreless flexible auger and in the space between the auger and the inner diameter of the pipe.

In an embodiment, a shaft seal is mounted to permit function in pressurized piping.

In an embodiment, a removable settling pan for settling and collection of solid and slow flowing material is integrated.

In an embodiment, a removable settling pan for settling and collection of solid and slow flowing material is integrated.

In an embodiment, an electronic rotation monitor device, for alarm giving and with alarm output for extern alarm is integrated.

In an embodiment, the means for driving the auger is an electric motor/actuator.

In an embodiment, the means for driving the auger is a hydraulic motor/actuator.

In an embodiment, the means for driving the auger is a pneumatic motor/actuator.

In an embodiment, the means for driving the auger is a mechanical device/actuator.

In an embodiment, the means for driving the auger is manual activation.

In an embodiment, the engine is of two-stroke crosshead type.

In an embodiment, the rotation speed of flexible spiral auger is adjustable independent of the engine in which it is mounted.

DETAILED DESCRIPTION

It should be understood that the detailed description and specific examples, while indicating embodiments of the invention, are given by way of illustration only, since various changes and modifications within the spirit and scope of the invention will become apparent to those skilled in the art from the detailed description.

Figure 1:
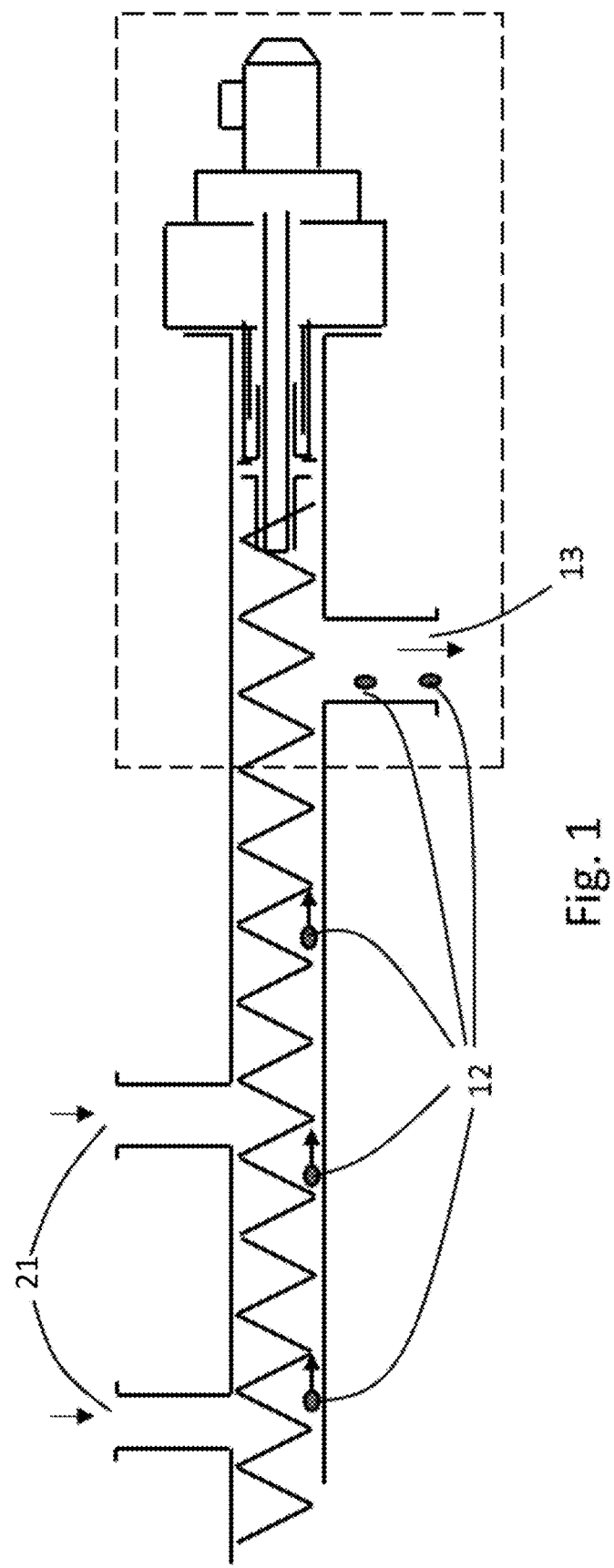
FIG. 1 A version of the drive unit.
Figure 2:
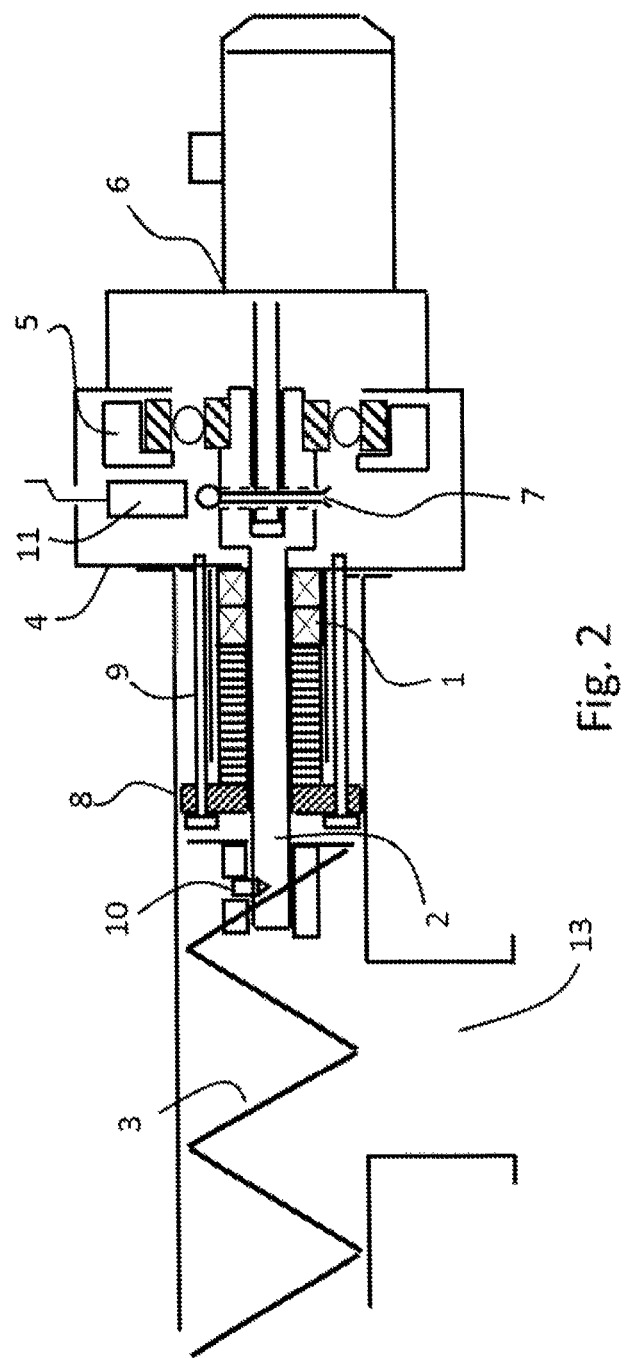
FIG. 2 Closeup of a part of a version of the drive unit.

FIG. 1 and FIG. 2 show one version of the drive unit. The shown version is designed for fixed mounting in pressurized piping system (drain piping from scavenge air space and piston underside and from scavenge air receiver of the engine).

FIG. 2 shows a version constructed with shaft seal (1). The function of the shaft seal is to seal against scavenge air pressure in the piping. Scavenge air pressure occur in these drain piping during normal operation of crosshead type two-stroke engines. The shaft (2) transfer the slow rotation motion from gearmotor (6) to centreless flexible auger (3). The housing (4) works both as strong base of the invention as well as end flange of the drain pipe. The bearing housing (5) transmit the axial and radial force from shaft via ball bearing. The gearmotor (6) rotate shaft and centreless flexible auger. The rotating force from gearmotor is transmitted via a shear pin (7), mounted through holes. The function of the shear pin is to safeguard gearmotor and centreless flexible auger against overload force.

The function of the slide bearing (8) is to transfer radial force from shaft (2) and to compress the shaft seal (1). The compression of the shaft seal is obtained by tightening of bolts (9). The tightening of the bolts will move the slide bearing (8) towards the housing (4) and thereby compress the shaft seal. This way the shaft seal will provide sealing between stationary housing (4) and rotating shaft (2). The centreless flexible auger (3) is fixed to the shaft (2) by tightening of screw (10) (e.g. a pinol screw) into recess in the shaft. The inductive sensor (11) is detecting/monitoring the desired rotation of the shaft.

Figure 3:
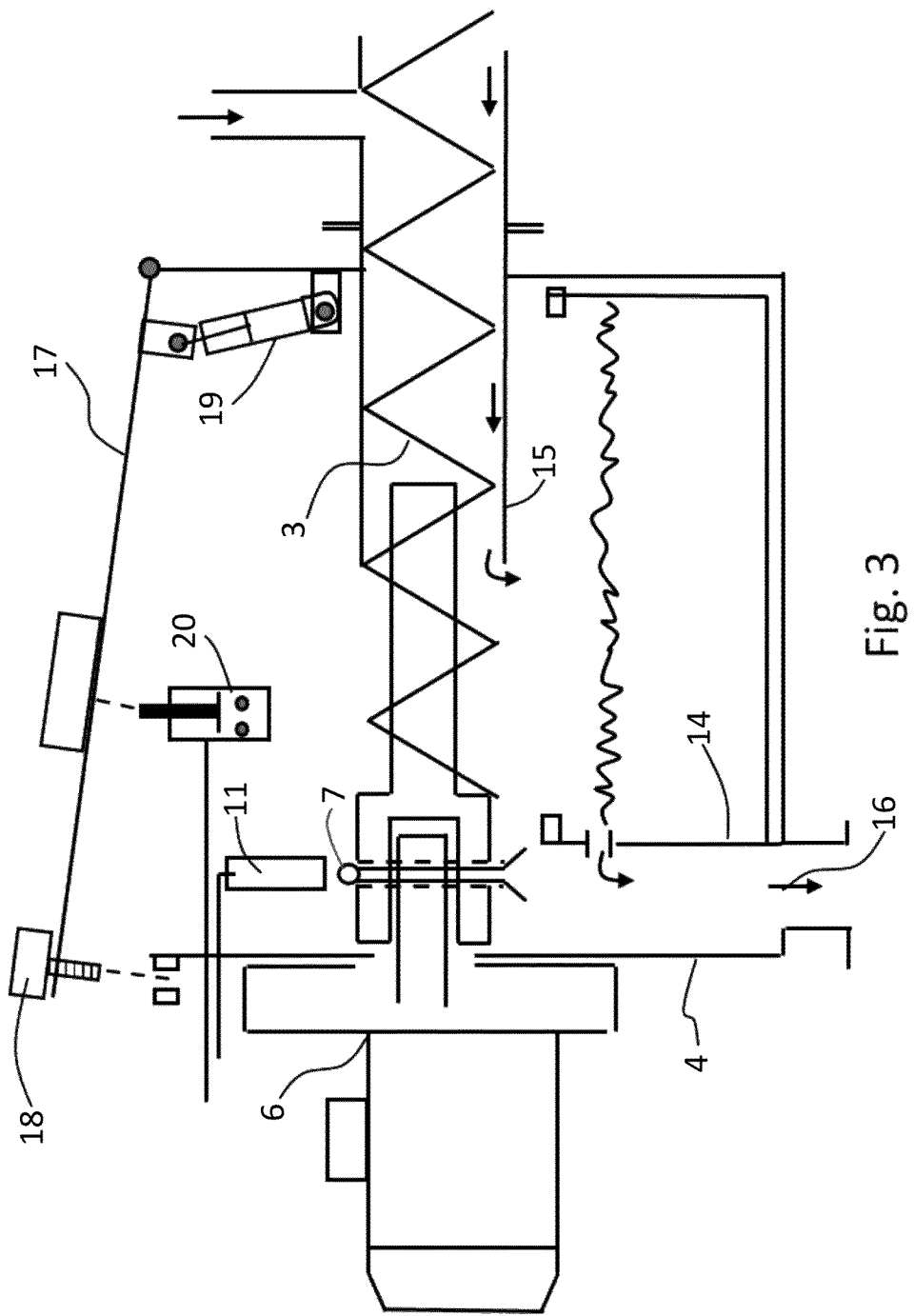
FIG. 3 A version of the drive unit designed for fixed mounting in unpressurized (open) drain systems.

FIG. 3 shows a version of the drive unit designed for fixed mounting in unpressurized (open) drain systems. (piping draining from piston rod stuffing boxes of the engine). This version is designed with a removable settling pan (14) for settling and collection of solid and slow flowing material. The gearmotor (6) is bolted onto the housing (4) of the drive unit. The centreless flexible auger (3) is mounted on the shaft of the gearmotor. The rotation is transmitted from gearmotor to shaft via a shear pin (7). The inductive sensor (11) is detecting/monitoring the desired rotation of the shaft.

The centreless flexible auger (3) is keeping the heavy and solid parts of substance (mainly soot/sludge) moving slowly through the pipe. This ensures that heavy and solid parts of the substance are not allowed to settle and stick to the inner pipe wall. This is especially important when the drain pipes are having low or no inclination. The liquid part of the substance (mainly lubricating oil) flow in the hollow part of the centreless flexible auger and in the space between the auger and the inner diameter of the pipe. The blend of liquid and heavy solid substances drops from the pipe (15) down into the settling pan (14). The settling pan will overflow and relative clean oil will flow from the drive unit via outlet pipe (16). The heavy and solid parts of the substance (mainly soot/sludge) will settle and collect in the settling pan (14). When settling pan is nearly filled with heavy/solid substance, it can be emptied by lifting it out of the drive unit. The cover (17) is normally kept closed by threaded knops (18). The gas springs (19) keeps the cover in open position when emptying the settling pan. The safety switch (20) prevent rotation of auger and gearmotor, when cover (17) is opened.

From operational experience with cross head type two-stroke engine, it is well known that drain piping is partly or fully clogging up during normal operation. This phenomenon occurs as a result of the drained substance composition. The drained substance is composed of lubricating oil mixed with heavy and solid particles (mainly soot/sludge and other unburned components), these solid or slow flowing particles and components have a tendency to settle and stick to the inner wall of drain piping. Hereby deposits are build up layer by layer, starting from the pipe bottom. This happens relatively quickly and results in blockage of the drain piping during normal operation. The settled deposits in the pipes become very hard and very difficult to remove. The phenomenon occurs as the relatively small amount of lubricating oil drained during normal engine operation is insufficient to keep the solid/slow flowing components flowing through the pipe. There are examples where newly cleaned piping clogs up after only 3 weeks of normal operation.

Cleaning is currently mainly done by dismantling the piping system and perform manual cleaning with long iron rods and other known pipe cleaning tools. This demands high number of man hours and consumption of various chemicals and cleaning materials.

Some engines require more than 1000 man-hours per year on manual cleaning of these pipes. The work is to discomfort, as it often occurs in inconvenient and hazardous positions. Furthermore, the cleaning often involves usage of potential health and environment damaging chemicals and diesel oil.

Cleanness of the drain pipes is essential to safe and reliable operation of the engine. The drain piping on these engines are designed for the draining of relative small amount (slow flow in the pipes) of lubricating oil mixed with heavy/solid components by gravity flow. The same drain piping is having another vital safety related purpose. During abnormal operation conditions, large leakages (fast flow inside the pipes) of fuel, cooling water or lubricating oil may occur from these engines. It is of outmost importance, that the drain piping is clean and empty—standby to drain away such abnormal large leak by gravity flow. Safe and efficient draining in such abnormal condition is essential for the safety of personnel and protection of the engine.

The purpose of my invention is to constant avoiding build-up of deposit inside the drain pipes during normal operation. My invention will prevent partly or full blockage of the drain piping. The invention will help to trouble free, reliable and safe continued operation of the engine. The invention will give dramatic savings in man-hours, cleaning chemicals and materials used during manual pipe cleaning.

The centreless flexible auger is able to follow the pipe through bends and turns due to flexible design.

In my invention the centreless flexible auger can be optimized for maximum flexibility. Maximum flexibility is desirable in engine drain piping as they often have relative sharp bending's (relative small bending diameter). In order to optimize the auger for max flexibility, it is necessary to use relative thin and slender spiral design. This will weaken the auger, and it will be less capable in torque and longitudinal force. In my invention there is low requirement for torque and longitudinal force, as the auger do not need to carry out any actual transport. The purpose of the very slow rotating auger is solely to keep heavy, solid and slow flowing particles moving along with the freely flowing oil, thus avoiding deposit building up inside the pipe.

Figure 4:
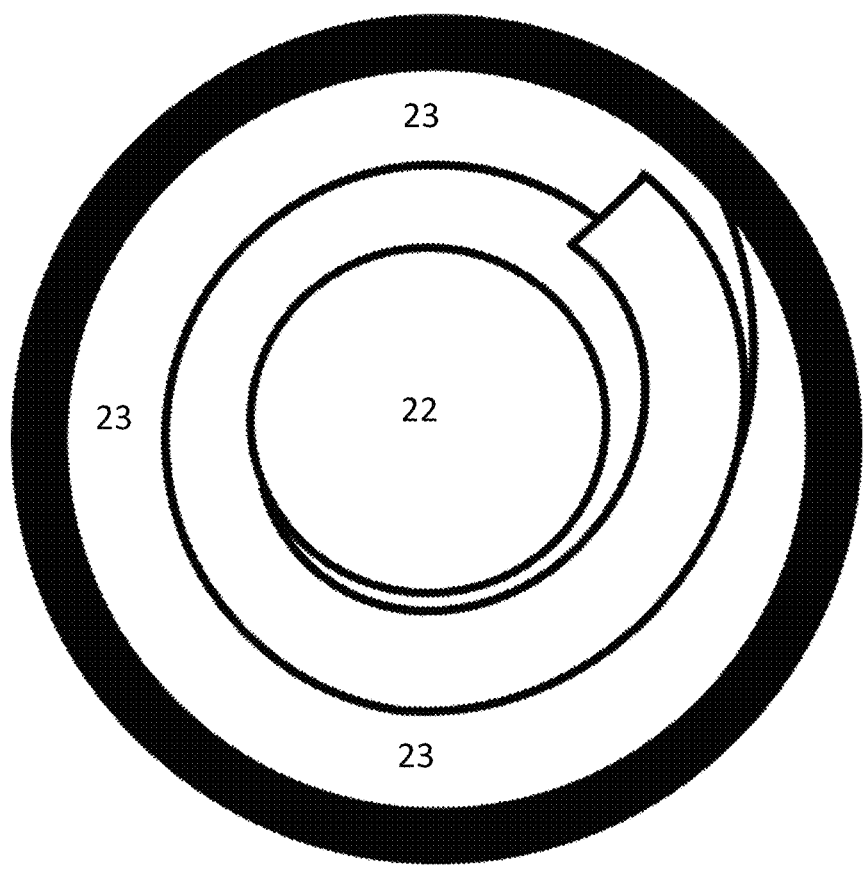
FIG. 4 Flexible auger inside drain pipe (seen from end).

FIG. 1 shows Mixed substance entering the drain piping from top (21), The slow rotation speed of the auger (3) inside the pipe creates a scraping action on the lower part of the pipe inner wall, thereby keeping heavy, solid and slow flowing particles (12) in motion towards the pipe outlet (13). The rotating speed of the auger can therefore be extremely low and start/stop of rotation can also be considered, depending of soiling degree. The main transport trough the piping is the free flow of liquid (oil or water) which flows in the hollow part (22) of the centreless flexible auger and in the space between the auger and the inner diameter of the pipe (23) as illustrated in FIG. 4. The free flow of liquid normally occurs as a result of gravitation due to pipe inclination, or due to pressure difference between pipe inlet and outlet. In some systems the flow of liquid occurs as a combination of gravity and pressure difference.

The invention is mounted in either end of the pipe being kept clean. The direction of rotation can be changed in the drive unit thus allow it to either push away from drive unit or drag heavy, solid and slow flowing particles towards the drive unit. The rotation of the auger can be performed by electrical motor/actuator, hydraulic motor/actuator, pneumatic motor/actuator, mechanical device or manual (by hand).

The use of centreless flexible auger is known in other applications e.g. transport of grain and granulate in the agricultural sector or for transport of ashes and cinders from large boilers. In these applications there are normally demands for transportation. The auger is therefore optimised for transport by using a relative thick and strong spiral design. The strong spiral design compromises the flexibility of the auger and only relative soft pipe bending can be applied. These transport applications normally apply relative high speed of rotation to the auger.

GB 468813 A (GEORGE S.) describes an automatic cleaning system with an auger fixed mounted in a trough (pipe) system. Transport of solid material (ash, slag and cinders) takes place when the auger is rotating and scrapes the trough (pipe) bottom inner wall. It also describes that the trough (pipe) is filled with water (to extinguish any embers or flames in the ash/slag). This technique is used on boilers.

GB 468813 A (GEORGE S.) deviates significantly from my invention, as my invention is fixed mounted on cross head type two-stroke engines. Furthermore GB 468813 A (GEORGE S.) deviates, as the purpose in my invention is to keep the pipe empty and standby to handle abnormal leaks.

Also, various pipe cleaning tools and devices are known technique. These are characterized by pushing various band or wire type into the pipe via an opening in the piping. The devices are normally handheld/portable. They all require an opening in the piping to be inserted. These pipe cleaning devices and tools are for temporary use. They are normally used when piping is found partly or fully clogged. The purpose of their use, is to penetrate and open the clogged area (plug) inside the pipe. These devises are not designed for fixed mounting in the piping system or for continuous preventative operation.

Automatic cleaning system with rotating flexible centreless spiral auger fixed mounted in piping system draining from piston rod stuffing boxes of the engine, drain piping draining from scavenge air space and piston underside space of the engine and drain piping draining from scavenge air receiver of the engine, on engines of two-stroke crosshead type (large marine and stationary engines). It is characterized by having a centreless flexible auger fixed mounted in the piping system. Furthermore, characterized by the fact that, main transport trough the piping is the free flow of liquid (oil or water) which flows in the hollow part of the centreless flexible auger and in the space between the auger and the inner diameter of the pipe. It is furthermore characterized by having the possibility to adjust the rotation speed of flexible spiral auger independent of the engine in which it is mounted.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. An automatic cleaning system comprising a rotating flexible centerless spiral auger fixed mounted in a piping system, the piping system comprising drain piping draining from piston rod stuffing boxes of an engine, drain piping draining from scavenge air space and piston underside space of the engine, and drain piping draining from scavenge air receiver of the engine, wherein the centerless flexible spiral auger fixed mounted in a pipe of at least one of the drain piping of the piping system, where a main transport through the piping system is the free flow of liquid which flows in the hollow part of the centerless flexible auger and in the space between the auger and the inner diameter of the pipe.

2. The system of claim 1, wherein a shaft seal is mounted to permit the automatic cleaning system to function when the piping system is pressurized.

3. The system of claim 1, wherein a removable settling pan for settling and collection of solid and slow flowing material is integrated.

4. The system of claim 1, wherein an electronic rotation monitor device, for alarm giving and with alarm output for external alarm is integrated in the automatic cleaning system.

5. The system of claim 1, wherein means for driving the auger is an electric motor/actuator.

6. The system of claim 1, wherein means for driving the auger is a hydraulic motor/actuator.

7. The system of claim 1, wherein means for driving the auger is a pneumatic motor/actuator.

8. The system of claim 1, wherein means for driving the auger is a mechanical device/actuator.

9. The system of claim 1, wherein means for driving the auger is manual activation.

10. The system of claim 1, wherein the engine is a two-stroke crosshead engine.

11. The system of claim 1, wherein the rotation speed of the flexible spiral auger is adjustable independent of the engine in which the flexible spiral auger is mounted.

12. The system of claim 2, wherein a removable settling pan for settling and collection of solid and slow flowing material is integrated.

13. The system of claim 2, wherein an electronic rotation monitor device, for alarm giving and with alarm output for external alarm is integrated in the automatic cleaning system.

14. The system of claim 3, wherein an electronic rotation monitor device, for alarm giving and with alarm output for external alarm is integrated in the automatic cleaning system.

15. The system of claim 2, wherein means for driving the auger is an electric motor/actuator.

16. The system of claim 3, wherein means for driving the auger is an electric motor/actuator.

17. The system of claim 4, wherein means for driving the auger is an electric motor/actuator.

* * * * *